United States Patent Office 3,545,129
Patented Dec. 8, 1970

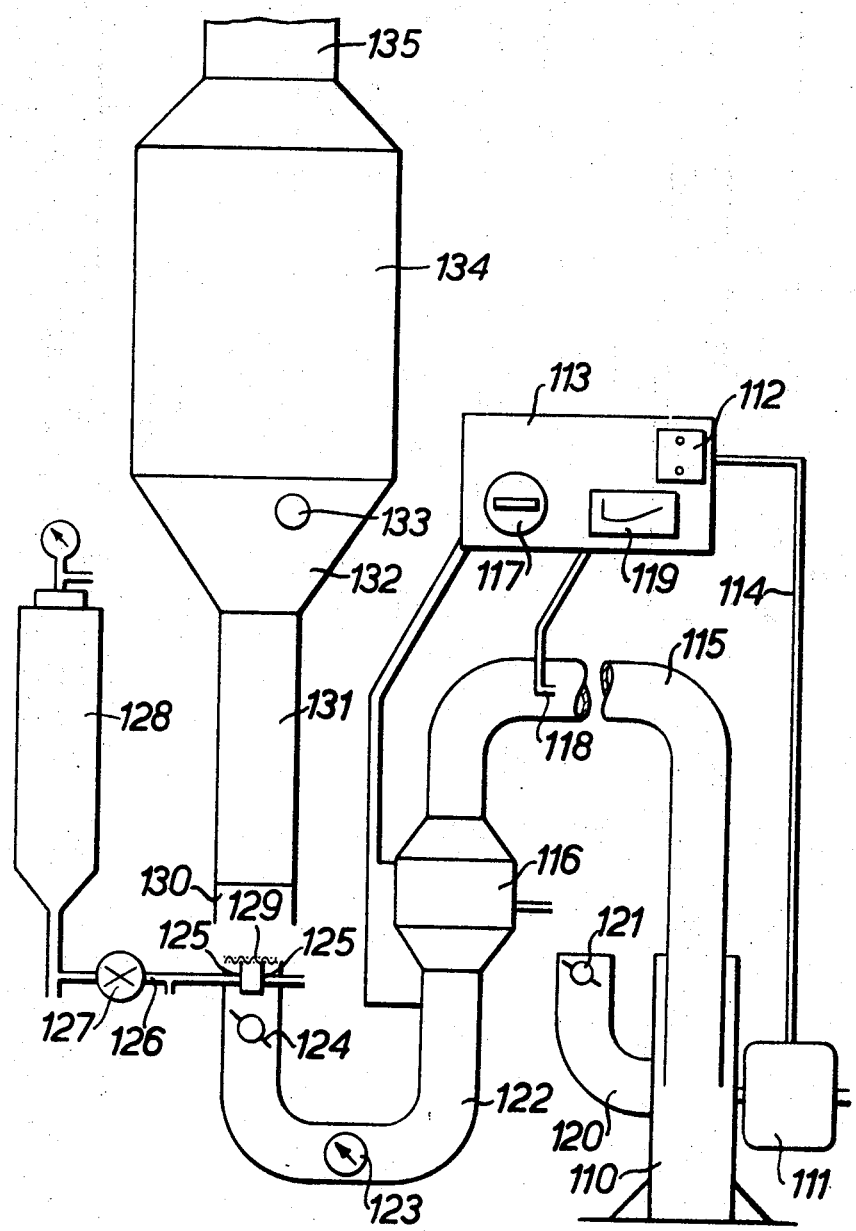

3,545,129
MANUFACTURE OF DORMANT
PELLETED SEEDS
Kurt Schreiber and Lucien J. La Croix, Winnipeg, Manitoba, Canada, assignors to Canadian Patent and Development Limited, Ottawa, Ontario, Canada, a corporation of Canada
Filed June 20, 1968, Ser. No. 738,584
Claims priority, application Canada, June 28, 1967, 994,190
Int. Cl. A01c 1/06
U.S. Cl. 47—57.6
23 Claims

ABSTRACT OF THE DISCLOSURE

Novel multiple coated seeds are provided by a novel process, the seeds including an inner coating which is slowly permeable to water, an intermediate coating which also is semi-permeable to water, and an outer coating which is substantially impermeable to moisture but is fissionable at frost temperatures.

This invention relates to the treatment of seeds and particularly is directed to the preparation of novel coated seeds and to the seeds so formed. The invention is more particularly directed to the preparation of coated seeds primarily for the fall planting of spring crops.

In northern areas of Canada, as well as in other regions similarly located in other countries or having similar climates, the cultivation of higher yielding winter crops is impractical due to the severe winter conditions. Spring seeding is, in spite of temperatures conducive for the germination of seeds, usually delayed by three to four weeks due to adverse weather conditions, such as morning frost, high winds and excess of moisture. With the relatively short growing periods available, this delay in seeding frequently prevents timely maturing of the crop and, as a rule, reflects adversely in yields and quantities of various crops.

It is an object, therefore, of one aspect of the present invention to treat seeds in such a manner that they may be planted in the fall so that advantages of early emergence in the spring can be obtained.

An object of another aspect of the present invention is the provision of a novel coated seed which may be used for the fall planting of spring crops.

An object of still another aspect of the present invention is the provision of a procedure for preparing these novel coated seeds.

An object of yet another aspect of this invention is the provision of a novel agricultural procedure.

By one broad aspect of the present invention, a seed is provided having a multiple coating thereon, the multiple coating comprising: (a) an inner coating which is slowly permeable to water; (b) an intermediate coating which is semi-permeable to water; and (c) an outer coating which is substantially impermeable to moisture but is fissionable at frost temperature.

By a second aspect of the present invention, a process is provided for the preparation of coated seeds, the process comprising: (a) depositing consecutive, thin layers of an inner coating by atomizing, through a spraying nozzle, a first coating solution and impinging the atomized first coating solution onto the seeds being coated, the impingement being conducted in the presence of a forced flow of heated drying air (preferred conditions of such operation being: the air inlet temperature being from 100–110° F., the air outlet temperature being from 80–100° F., the atomizing air pressure being 30–40 p.s.i., the air flow rate being from 75–150 cubic feet per minute, and the atomizing nozzles being of a size 40–100–120 or 60–100–120) in which the plurality of consecutive, thin layers provide an inner coating of a thickness of between about 1.0–3.0 mm.; (b) depositing consecutive, thin layers of an intermediate coating by atomizing, through a spraying nozzle, a second coating solution and impinging the second coating solution onto the seeds containing the inner coating, under the influence of a forced flow of heated drying air (preferred conditions of operation being: the air inlet temperature being 100–125° F., the air outlet temperature being 90–115° F., the air flow rate being 150 cubic feet per minute, the atomizing air pressure being greater than 40 p.s.i., and the atomizing nozzle being of a size 20–50–70 or 28–50–70), the plurality of consecutive, thin layers providing an intermediate coating of a thickness of between about 0.05–0.10 mm.: and (c) depositing consecutive, thin layers of an outer coating by atomizing, through a spraying nozzle, a third coating solution and impinging the atomized coating solution on the seeds bearing the inner coating and the intermediate coating while under the influence of a forced flow of heated drying air (preferred conditions of operation being: The air inlet temperature being 100–130° F., the air outlet temperature being 90–120° F., the air flow rate being 150 cubic feet per minute, the air atomizing pressure being greater than 40 p.s.i., the nozzle being of a size 20–50–70 or 28–50–70), the consecutive, thin layers providing an outer coating of a thickness of between about 0.05–0.10 mm.

By a third aspect of this invention, an agricultural method is provided which comprises selecting a seed of a spring crop, said seed having a multiple coating thereon, the multiple coating comprising: (a) an inner coating which is slowly permeable to water; (b) an intermediate coating which is semi-permeable to water; and (c) an outer coating which is substantially impermeable to moisture but is fissionable at frost temperatures; and planting such spring crop seed in the autumn of the year, whereby the seed may lie dormant during the winter months and will germinate early the following spring.

The inner coating which is slowly permeable to water is known as the "spring jacket" and is composed of a coating material, a binder and a plasticizer and, optimally, a moisture-control factor. Two or more of the coating materials may be combined with 12–20% on a weight-to-weight basis of one or more of the binders. One of the plasticizers is added at a concentration of approximately 1% on a weight-to-weight basis of the coating material-binder combination. The moisture-control factors are added in the same proportion as the plasticizers.

The coating materials which are contemplated include: sandy loam, powdered talc, ground limestone, powdered charcoal, powdered silica, gypsum, powdered feldspar, powdered vermiculite, kaolin, and ground peat moss. Among the binders contemplated are: granulated sugar, alginates, karaya gum, jaguar gum, tragacanth gum, polysaccharide gum and mucilage. Among the plasticizers contemplated are: glycerol, propylene glycol, ethyl phthalate, castor oil, triacetin and diethyl phthalate. Among the moisture control factors contemplated are: methyl cellulose and ethyl cellulose.

It is observed that the coating material usually consists of a mixture of loam and talc in an aqueous organic solvent system. Any inorganic soil may be utilized but the amount of soil added depends on the proportion of clay in the soil. If loam is used as the soil, and depending on the texture of the loam, the loam-to-talc proportions would vary from 1:3 to 3:1 with a proportion of 1:1 being commonly used. While a variety of organic solvent systems may be selected, ethyl alcohol is the organic solvent of choice. This chemical is non-toxic to the seeds and is sufficiently volatile to allow rapid drying of the coating material without changes in moisture content of the seeds at operating temperatures below 90° F.

The low operating temperature of 90° F. is non-damaging to the seeds and is facilitated by the evaporative cooling effect. In addition, ethyl alcohol is an economically attractive article of commerce.

The ratio of ethyl alcohol to water ranges from 1:1 to a maximum of 2:1 on a volume-to-volume basis depending on the rate of evaporation and maximum temperature desired. The solids of the coating material are added to the solvent system at the rate of from 1 to 2 grams per ml. of solvent.

Preferred binders and plasticizers include: sugar, glycerine and propylene glycol. The materials useful as binders serve to maintain the structure of the coat, while the plasticizers allow for elasticity and prevent brittleness. It is necessary to have both these materials, since neither of the materials would adequately serve the dual purpose.

It is advantageous to include, in the "spring jacket," materials which provide the proper oxidation state for the germinating seed and also to provide a disinfecting fungicide. It has been found that the addition of from 2 to 3 ml. of hydrogen peroxide and one-half gram of tannic acid and one-half gram of pyrogallol per 1000 grams of coating solids results in superior germination of the seed. This addition is most effective if the pH of the coating material is maintained at about 8.0. Changes in the oxidation-reduction potential of the coating material appear to provide the beneficial effect.

The substances used for the "spring jacket" are slowly permeable to water, thus deferring the germination of the seed to a time when soil, moisture and temperature are at an optimum. Under conditions which prevail in Manitoba, this occurs by the end of April. This differs from the common procedures for the preparation of pelleted seeds which are designed to produce seeds which germinate at an equal or greater rate than bare seeds. The procedure involving the use of a "spring jacket" in the present invention includes the addition of moisture control factors with the objective of delaying germination after the spring thaw to a time when the risk of spring frosts can be avoided. At the same time the ingredients are selected so that seed viability is maintained from fall planting to a time when spring germination is desired.

The intermediate coating is a lining which is semipermeable to water and which is preferably a thin layer of methyl cellulose or a combination of ethyl cellulose and methyl cellulose in alcohol solution, which serves to separate the "spring jacket" from the outer coating which will be described hereinafter. The liner not only serves to maintain the "spring jacket" in a physically intact state, but being semipermeable to water, provides an additional delay mechanism to serve the purpose of the "spring jacket" previously described. Water permeability of the liner can be adjusted by changing the proportions of the methyl cellulose (which is water soluble) to ethyl cellulose (which is water insoluble). The thickness of the layer ranges from 0.05 to 0.10 mm. Ethyl alcohol is the preferred solvent for the lining solution for the reasons previously described. The liner is normally applied as a 4–5% on a weight-to-volume basis of the cellulose solution in ethyl alcohol.

The outer coating is known as the "winter jacket" and is an outer layer of materials impermeable to moisture but subject to fission by frost during the winter. There are a large number of synthetic or naturally occurring plastic materials which are suitable for this purpose and amongst the examples of such suitable materials are polystyrene, beeswax, acrylic resins, polyvinyl chloride, cellulose nitrate, polyethylene and shellac. The "winter jacket" is preferably composed primarily of a synthetic plastic material which is subject to fission under freezing conditions together with plasticizers and a solvent. In addition to the synthetic plastic material, ethyl celluloses of various viscosities and beeswax may also be used. The solvent used will depend upon the solubility properties of the coating material. Chloroform has a relatively low boiling point and is a good solvent for polystyrenes. However, dichloromethane is also suitable as a solvent. The concentration of the resin in the solvent would range from 1.0 to 1.5% on a weight-to-volume basis.

Plasticizers are essential in order to attain a thin uniform coating over the seed and the plasticizers include gelatin, glycerine, and propylene glycol, as well as the other plasticizers mentioned with respect to the "spring jacket." The resin-to-plasticizer ratios which are useful range from 2:1 to 6:1 on a weight-to-volume basis.

In general, the thickness of the "spring jacket" is from 1.0 to 3.0 mm. depending upon the initial shape of the seed. The thickness of the liner is from 0.05 to 0.10 mm. and the thickness of the "winter jacket" ranges from 0.05 to 0.10 mm. These films are uniform by virtue of calibration and punctual control of temperature, air flow and size of spraying nozzles in the procedure for preparing the various jackets. The operable limits of these variables will be described hereinafter, following a brief description of the apparatus used to prepare the pelleted seeds.

The apparatus preferably used is one which is known as a Wurster air suspension apparatus and is embraced in substance by U.S. Pat. No. 2,648,609 issued Aug. 11, 1953 to Dale E. Wurster and U.S. Pat. No. 2,799,241 issued July 16, 1957 to Dale E. Wurster.

In the accompanying drawing, the single figure is a schematic elevational view of the entire coating apparatus used in carrying out the process of an aspect of this invention.

Referring now to the accompanying drawing, the apparatus includes a system to provide heated drying air. This system includes a blower 110 which is used to force drying air through the system, the blower being driven by a motor 111. The blower is normally a centrifugal fan-type blower which is considered to be most economical and efficient for large volumes of air at low pressure head. These blowers are simple, long lasting and require little maintenance. The motor 111 is usually directly connected to the shaft of the blower. Normally a drip-proof motor should be used, although for hazardous locations an explosion-proof motor would be required. It is believed that a 1 H.P. motor would provide up to 190 cubic feet per minute of air. The motor is provided with a starter 112 located on an instrument panel 113 and connected to the motor by suitable electrical connections 114. Tthe motor starter usually is enclosed, and if the apparatus is located in an enclosed area where considerable amounts of flammable liquids are stored or used without adequate ventilation, an explosion-proof starter would be used. Leading from the blower 110 is an air duct 115 connected to a heating section 116 of enlarged diameter, controlled by a temperature controller 117 located on the instrument panel 113. Disposed in the air duct 115 between the blower 110 and the heating section 116 is a pitot tube 118 which is used to determine the air velocity through the duct and hence the quantity of air flow through the system. The pitot tube is used in conjunction with a draft gauge 119 which is mounted on the instrument panel 113. For best results, it has been found that the pitot tube should be installed at least four duct diameters from an elbow and should be positioned in the longitudinal centre of the duct.

The blower 110 is provided with an inlet duct 120, provided with an inlet damper 121 used to provide rough adjustment of the process air.

The heating section 116 may be a steam heat exchanger although an electrical heating element may be used. However, a steam heating section is preferred from a safety standpoint. The heater section discharges into a heated air duct 122 provided with a thermometer 123 which is used to determine the temperature of the inlet air conveyed to the coating section of the apparatus. If desired, a heat sensing element connected to a temperature recorder may be used instead of the thermometer, in order to provide a continuous record of the inlet air temperature. It is also advisable to include a wet bulb thermometer (not shown) along with a temperature thermometer in order to determine that inlet air humidity. The heating air duct 122 is also provided, adjacent to the discharge end, with a damper for accurate adjustment of the volume of the processed air.

Disposed at the outlet of the heated air duct 122 is an atomizing nozzle 125. The nozzle used is a standard stock nozzle which was purchased from Spraying Systems Company. The nozzle is of a suction flow type. The atomizing energy is furnished by high pressure air supplied at from 30 to 70 p.s.i. to the nozzle from an air regulator (not shown). The nozzle 125 is connected via tubing 126 and a control valve 127 to a coating fluid reservoir 128. The reservoir 128 is usually made of stock length of Pyrex (registered trademark) tempered glass pipe. The gaskets and fittings are also stock Pyrex items. The end closures are specially fabricated and are normally made of inexpensive materials but can, in a preferred embodiment, be fabricated of stainless steel. It is important that special care be exercised in torquing up the end bolts so that undue localized strain is not set up on the glass pipe. If the glass pipe is to be used under pressure to force out the coating fluid, a metal grating screen should be kept around the glass pipe to protect personnel from glass fragments in case of breakage.

The tubing which is used to convey the coating fluids from the reservoir to the atomizing nozzle is usually formed of nylon. Ball type valves provide good service. Normally brass fittings and valves are used, although stainless steel fittings and valves can be provided for special application. The simplest and most economical liquid flow control can be obtained by pressurizing the liquid reservoir to about 10 p.s.i. using a needle-type throttling valve to control the flow of the atomizing nozzle. The use of a metering pump as an optional feature can provide more consistent and reproducible results. A simple pump manufactured by Sigmund Motor Company provides good results.

Also provided at the region of the spraying nozzle are stainless steel screens 129 which control the air pattern and prevent the product from dropping into the air duct when air is not flowing.

In the region immediately above the stainless steel screens is a zone 130 where the product is coated with the atomized spray. This section is normally tapered, and is fabricated of stainless steel or of clear plastic material, e.g. Lucite (the trademark for polymethyl methacrylate). The lower end of the tapered section is usually fitted with a slide valve which is used to remove the product after coating. Connected to the coating section 130 is a drying section 131 where the coated product is dried and then returned to the coating section 130. The drying section is normally made of clear plastic in order to permit observation of the coating process by the operator.

Connected to the drying section is an inverted frusto-conical transition section 132. This transition section 132 is also made of clear plastic so as to allow visible observation of the coating process when coating fine particles of powder. Disposed within the transition section 132 is a thermometer 133 which provides an indication of the coating process temperature. This thermometer 133 as well may be replaced by a temperature sensing element (not shown) connected to a temperature recorder for continuous recording of the process temperature. A temperature controller (not shown) may also be provided here to control the coating fluid rate to provide a constant process temperature.

Connected to the outlet of the transition section 132 is a settling chamber 134 which is consturcted of stainless steel. The main purpose of the settling chamber 134 is to allow fine particles to return to the coating and drying section, thus preventing them from being carried out with the exhaust air. The settling chamber is provided with an exhaust duct 135. Optionally, the apparatus may be fitted to this point with a suitable filter or other means for removing particles of dust.

By the present modification and adaption of the process claimed in U.S. Pat. No. 2,648,609, a process is provided which includes the steps of moving an air stream in a confined space upwardly past the seeds with a force sufficient to suspend them continuously therein, and introducing the coating solution in the form of an atomized mist into the air stream prior to its contact with the seeds. It is also to be observed that in this modification, the air stream is heated to dry quickly the coating applied to the seeds.

The operation of the procedure using the apparatus heretobefore described may be briefly summarized in the following terms. Heated air is forced through the apparatus by means of a blower. The coating solution is atomized through a spraying nozzle and is deposited on the seed to be coated in thin layers which are quickly dried under the influence of the heated drying air. The rapid drying provides a cooling effect which prevents heating of the product. Application of a plurality of thin, consecutive layers of coating materials soon adds up to the total coating required. The degree of dryness of the finished coat can be controlled by conditions within the apparatus during the coating operation.

It has been found that the following operating conditions are suitable for carrying out preferred embodiments of the present invention:

| Operating conditions | Spring jacket | Liner | Winter jacket |
| --- | --- | --- | --- |
| Inlet temperature, ° F | 100–110 | 100–125 | 100–130 |
| Outlet temperature, ° F | 80–100 | 90–115 | 90–120 |
| Air flow rate, c.f.m | 75–150 | 150 | 150 |
| Atomizing air pressure, p.s.i | 30–40 | 40 | 40 |
| Nozzle size | 1 40–100–120 | 2 20–50–70 | 2 20–50–70 |

The general technique for the production of the seed of an aspect of the present invention may be described as follows:

Approximately 500 grams of seed which may, for example, be spring wheat, were used in one run. The materials used for the "spring jacket" are blended with the solvent to form a suspension. The coating process is commenced with a slow pumping rate, which is thereafter controlled to prevent conglomeration of the seed. The initial processing air flow is approximately 50 c.f.m. and gradually increased to approximately 150 c.f.m. as the seed size increases. The operation is continued by the addition of the liner. The time involved for the whole procedure is approximately one hour.

The "winter jacket" is then applied to approximately 500 grams of the seed which are coated with the "spring jacket" and the liner. Smaller nozzles are used for the production of the "winter jacket" and therefore the coating time varies from one-half to six hours.

The following are examples of coating compositions which are used to coat 500 grams of spring wheat seed:

EXAMPLE 1

"Spring jacket":
    Sandy loam—1090 grams
    Granulated sugar—160 grams
    Glycerin—12.8 cc.
    Hydrogen peroxide—5.0 cc.
    Fungicide (known by the trade name of "Panogen")—0.4 cc.
    Water—280 cc.
    Ethanol—520 cc.

Lining:
    Methyl cellulose (15 cps.)—20 grams
    Water—250 cc.

Ethanol—250 cc.
"Winter jacket":
    Polystyrene—15 grams
    Ethyl cellulose (L.V.)—5 grams
    Propylene glycol—5.5 cc.
    Chloroform—2 liters

EXAMPLE 2

"Spring jacket":
    Sandy loam—240 grams
    Talc powder—850 grams
    Granulated sugar—160 grams
    Glycerin—12.8 cc.
    Hydrogen peroxide—5.0 cc.
    Fungicide (Panogen)—0.4 cc.
    Water—280 cc.
    Ethanol—520 cc.
Lining:
    Ethyl and methyl cellulose (total)—20 grams
    Ethanol—500 cc.
"Winter jacket":
    Polystyrene—20 grams
    Ethyl phthalate—8.5 cc.
    Propylene glycol—3.0 cc.
    Dichloromethane—1.25 liters For Example 3, only the constitution of the "spring jacket" is given.

EXAMPLE 3

"Spring jacket":
    Talc powder—375 grams
    Sandy loam—375 grams
    Granulated sugar—120 grams
    Methyl, ethyl cellulose mixture—15 grams
    Sodium alginate—6.4 grams
    Sodium silicate—1.0 grams
    Magnesium chloride—2.0 grams
    Glycerin—10 cc.
    Tannic acid—0.25 gram
    Pyrogallol—0.25 gram
    Hydrogen peroxide—5 cc.
    Water—280 cc.
    Ethanol—520 cc.

For Examples 4, 5 and 6, only the constitution of the "winter jacket" is given.

EXAMPLE 4

"Winter jacket":
    Polystyrene—7.5 grams
    Ethyl cellulose—7.5 grams
    Ethyl phthalate—6.5 cc.
    Propylene glycol—2.5 cc.
    Chloroform—1 liter

EXAMPLE 5

"Winter jacket":
    Beeswax—10 grams
    Heptane—12.5 cc.
    Propylene glycol—2.5 cc.
    Chloroform—1 liter

EXAMPLE 6

"Winter jacket":
    Beeswax—15 grams
    Acryloid—7.5 cc.
    "150" (Canadian Industries Ltd.)—7.5 cc.
    Propylene glycol—5.0 cc.
    Chloroform—1200 cc.

Seeds coated according to an aspect of the present invention were tested by means of germination tests conducted in greenhouses. Wheat seeds coated with the three baisic layers were cultured in soil for three weeks under optimal growing conditions. It was found that the seeds did not germinate and therefore no seedlings emerged.

The pots with the dormant wheat pellets were then placed in a cold chamber, exposed for one week to temperatures ranging from 10 to 20° F. and then returned to the greenhouse. It was found that the coating material was subjected to fission as a result of the frost and healthy seedlings emerged from the shell of the pellet.

Pelleted seeds of wheat, according to an aspect of this invention, were planted at one week intervals during the autumn in experimental intervals during the autumn in experimental plots. Results of this field test showed that spring emergence of wheat was obtained from such planting.

The preceding examples can be repeated with similar success by substituting the generically and specifically described reactants and operating conditions of this invention for those used in the preceding examples.

From the foregoing description, one skilled in the art can easily ascertain the essentially characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

We claim:
1. A seed having a multiple coating thereon, said multiple coating comprising:
    (a) an inner coating being slowly permeable to water and comprising particulate coating material, a plasticizer and a binder;
    (b) an intermediate coating of about 0.05–0.10 mm. in thickness, said coating being semi-permeable to water and consisting essentially of a layer selected from a group consisting of methyl cellulose and a mixture of methyl and ethyl cellulose; and
    (c) an outer coating being substantially inpermeable to moisture but fissionable at frost temperatures.

2. The seed of claim 1 wherein said particulate coating material is sandy loam, powdered talc, ground limestone, powdered charcoal, powdered silica, gypsum, powdered feldspar, powdered vermiculite, kaolin or ground peat moss.

3. The seed of claim 1 wherein the binder is granulated sugar, alginates, karaya gum, jaguar gum, tragacanth gum, polysaccharide gum or mucilage.

4. The seed of claim 1 wherein the plasticizer is glycerol, propylene glycol, ethyl phthalate, castor oil, triacetin or diethyl phthalate.

5. The seed of claim 1 wherein the particulate coating material comprises a mixture of loam and talc.

6. The seed of claim 5 wherein the ratio of loam to talc is from 1:3 to 3:1 on a weight-to-weight basis.

7. The seed of claim 1 wherein said inner coating further includes a minor quantity of methyl cellulose or ethyl cellulose.

8. The seed of claim 1 wherein the outer coating comprises a plastic material subject to fission under freezing conditions in combination with a plasticizer.

9. The seed of claim 8 wherein the plastic material is beeswax or shellac.

10. The seed of claim 8 wherein the plastic material is an acrylic resin, polyvinyl chloride, cellulose nitrate or polyethylene.

11. The seed of claim 8 wherein the plastic material is polystyrene.

12. The seed of claims 8 wherein the plasticizer is glycerol, propylene glycol, ethyl phthalate, castor oil, triacetin, or diethyl phthalate.

13. The seed of claim 8 wherein the ratio of plastic material-to-plasticizer is from 2:1 to 6:1 on a weight-to-volume basis.

14. The seed of claim 1 wherein the inner coating is 1.0 to 3.0 mm. in thickness, and the outer coating is 0.05 to 0.10 mm. in thickness.

15. The seed of claim 14 wherein the inner coating comprises granulated sugar, glycerin, a fungicide and a predominant amount of a sandy loam.

16. The seed of claim 14 wherein the inner coating comprises granulated sugar, glycerin, a fungicide and a predominant amount of a sandy loam and talc powder.

17. The seed of claim 16 wherein the inner coating further comprises a mixture of methyl cellulose and ethyl cellulose, sodium alginate, sodium silicate, magnesium chloride, tannic acid and pyrogallol.

18. The seed of claim 14 wherein the intermediate coating consists essentially of methyl cellulose.

19. The seed of claim 14 wherein the outer coating comprises polystyrene, ethyl cellulose, and propylene glycol.

20. The seed of claim 14 wherein the outer coating comprises polystyrene, ethyl phthalate, and a propylene glycol.

21. The seed of claim 14 wherein the outer coating comprises polystyrene, ethyl cellulose, ethyl phthalate, and propylene glycol.

22. The seed of claim 14 wherein the outer coating comprises beeswax, heptane, and propylene glycol.

23. The seed of claim 14 wherein the outer coating comprises beeswax, acryloid, a synthetic resinous polymer, and propylene glycol.

References Cited

UNITED STATES PATENTS

| 2,502,809 | 4/1950 | Vogelsang | 47—58 |
| 2,967,376 | 1/1961 | Scott | 47—57.6 |
| 3,172,752 | 4/1965 | Pierce | 71—62 |
| 3,205,060 | 9/1965 | Lindert | 71—7 |

ROBERT E. BAGWILL, Primary Examiner

U.S. Cl. X.R.

117—3; 71—64

UNITED STATES PATENT OFFICE
CERTIFICATE OF CORRECTION

Patent No. 3,545,129          Dated December 8, 1970

Inventor(s) Kurt Schreiber and Lucien J. La Croix

It is certified that error appears in the above-identified patent and that said Letters Patent are hereby corrected as shown below:

In the Specification:

Col. 6, in the Table, the "Nozzle size" should be:

---Nozzle size---------- 40-100-120 or     20-50-70 or     20-50-70 or
                         60-100-120        28-50-70        28-50-70

Signed and sealed this 16th day of May 1972.

(SEAL)
Attest:

EDWARD M. FLETCHER, JR.                ROBERT GOTTSCHALK
Attesting Officer                      Commissioner of Patents

FORM PO-1050 (10-69)